(12) United States Patent
Wu et al.

(10) Patent No.: US 8,216,958 B2
(45) Date of Patent: *Jul. 10, 2012

(54) SELECTIVE CATALYSTS HAVING SILICA SUPPORTS FOR NAPHTHA HYDRODESULFURIZATION

(75) Inventors: Jason Wu, Clinton, NJ (US);
Chuansheng Bai, Phillipsburg, NJ (US);
Thomas R. Halbert, Baton Rouge, LA (US); Stuart L. Soled, Pittstown, NJ (US); Sabato Miseo, Pittstown, NJ (US);
Jonathan M. McConnachie, Annandale, NJ (US); Valery Sokolovskii, Sunnyvale, CA (US); David M. Lowe, Sunnyvale, CA (US); Anthony F. Volpe, Jr., Santa Clara, CA (US); Jun Han, Sunnyvale, CA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/087,978

(22) PCT Filed: Jan. 12, 2007

(86) PCT No.: PCT/US2007/001002
§ 371 (c)(1),
(2), (4) Date: Aug. 31, 2010

(87) PCT Pub. No.: WO2007/084439
PCT Pub. Date: Jul. 26, 2007

(65) Prior Publication Data
US 2010/0320123 A1    Dec. 23, 2010

(51) Int. Cl.
*B01J 31/34* (2006.01)
*B01J 21/08* (2006.01)
*C10G 45/08* (2006.01)

(52) U.S. Cl. ........ 502/150; 502/167; 502/172; 502/255; 502/260; 208/216 R; 208/217

(58) Field of Classification Search .................. 208/209, 208/213, 216 R, 216 PP, 217, 243, 244, 245; 502/150, 151, 158, 167, 172, 240, 254, 255, 502/258, 260
See application file for complete search history.

(56) References Cited

U.S. PATENT DOCUMENTS
4,132,632 A    1/1979    Yu et al.
(Continued)

FOREIGN PATENT DOCUMENTS
EP    0 067 459 A1    12/1982
(Continued)

OTHER PUBLICATIONS

Hiroshima, Kazutaka, Mochizuki, Takeo, Honma, Takehide, Shimizu, Takehiro, Yamada, Muneyoshi, "High HDS activity of Co-Mo/Al2O3 modified by some chelates and their surface fine structures", Applied Surface Science 121/122 (1997), pp. 433-436.

(Continued)

*Primary Examiner* — Walter D Griffin
*Assistant Examiner* — Renee E Robinson
(74) *Attorney, Agent, or Firm* — Bruce M. Bordelon

(57) ABSTRACT

A method for hydrodesulfurizing FCC naphtha is described. More particularly, a Co/Mo metal hydrogenation component is loaded on a silica or modified silica support in the presence of organic ligand and sulfided to produce a catalyst which is then used for hydrodesulfurizing FCC naphtha. The silica support has a defined pore size distribution which minimizes olefin saturation.

19 Claims, 12 Drawing Sheets

Olefin Saturation vs. Median Pore Diameter

U.S. PATENT DOCUMENTS

| | | |
|---|---|---|
| 5,985,136 A | 11/1999 | Brignac et al. |
| 6,013,598 A | 1/2000 | Lapinski et al. |
| 6,602,405 B2 | 8/2003 | Pradhan et al. |
| 2002/0010086 A1 | 1/2002 | Plantenga et al. |
| 2002/0084211 A1* | 7/2002 | Stuntz et al. ............... 208/210 |
| 2003/0173256 A1 | 9/2003 | Fujikawa et al. |
| 2005/0139520 A1 | 6/2005 | Bhan et al. |
| 2006/0000751 A1 | 1/2006 | Bouchy et al. |

FOREIGN PATENT DOCUMENTS

| | | |
|---|---|---|
| EP | 0 181 035 A2 | 5/1986 |
| EP | 181 035 * | 5/1986 |
| GB | 950 952 | 3/1964 |
| GB | 1334606 A | 10/1973 |
| GB | 2 189 163 A | 10/1987 |
| WO | 96/41848 A1 | 12/1996 |

OTHER PUBLICATIONS de Jong, Arthur M., de Beer, V.H.J. (San), van Veen, J.A. Rob, Niemantsverdriet, J.W. (Hans), "Surface Science Model of a Working Cobalt-Promoted Molybdenum Sulfide Hydrodesulfurization Catalyst: Characterization and Reactivity", Journal of Physical Chemistry 1996, 100, 17722-17724.

Cattaneo, et al., The Relationship Between the Structure of NiMo/SiO2 Catalyst Precursors Prepared in the Presence of Chelating Ligands and the Hydrodesulfurization Activity of the Final Sulfided Catalysts, Journal of Catalysis 185, pp. 199-212, 1999.

Wang, et al., "Hydrodesulfurization of Dibenzothiophene Over Siliceous MCM-41-Supported Catalysts—I. Sulfided Co-Mo Catalysts", Journal of Catalysis, vol. 199, No. 1, Apr. 1, 2001, pp. 19-29.

* cited by examiner

Olefin Saturation vs. Median Pore Diameter

Olefin Saturation vs. Reciprocal of Median Pore Diameter

Olefin Saturation vs. Percentage of Mercury Pore Area for Pores with Pore Diameter > 150Å

SELECTIVE CATALYSTS HAVING SILICA SUPPORTS FOR NAPHTHA HYDRODESULFURIZATION

FIELD OF THE INVENTION

This invention relates to a method for hydrodesulfurizing naphtha. More particularly, a Co/Mo metal hydrogenation component is loaded on a silica or modified silica support in the presence of an organic additive and then sulfided to produce a catalyst which is then used for hydrodesulfurizing naphtha. The silica support has a defined pore size distribution which minimizes olefin saturation.

BACKGROUND OF THE INVENTION

Environmental regulations mandate the lowering of sulfur levels in motor gasoline (mogas). For example, it is expected that regulations will require mogas sulfur levels of 30 ppm or less by 2006. In many cases, these sulfur levels will be achieved by hydrotreating naphtha produced from Fluid Catalytic Cracking (FCC cat naphtha), which is the largest contributor to sulfur in the mogas pool. Since sulfur in mogas can also lead to decreased performance of catalytic converters, a 30 ppm sulfur target is desirable even in cases where regulations would permit a higher level. As a result, techniques are required that reduce the sulfur in cat naphthas while at the same time minimizing the reduction of beneficial properties such as octane number.

Conventional fixed bed hydrotreating can reduce the sulfur level of cracked naphthas to very low levels. However, such hydrotreating also results in significant octane number loss due to extensive reduction of the olefin content in the naphtha as well as excessive consumption of hydrogen during the hydrotreating process. Selective hydrotreating processes have recently been developed to avoid such olefin saturation and octane number loss. Unfortunately, in such processes, the liberated $H_2S$ reacts with retained olefins forming mercaptan sulfur by reversion. Unfortunately, the $H_2S$ liberated in the process reacts with retained olefins forming mercaptan sulfur by reversion. Such processes can be conducted at severities which produce product within sulfur regulations. However, significant octane number loss also occurs.

One proposed approach for preserving octane number during sulfur removal is to modify the olefin content of the feed using an olefin-modification catalyst followed by contact with an HDS catalyst (U.S. Pat. No. 6,602,405). The olefin modification catalyst oligomerizes the olefins.

One recently developed method of HDS is SCANfining which is a process developed by Exxon Mobil Corporation. SCANfining is described in National Petroleum Refiners Association paper #AM-99-31 titled "Selective Cat Naphtha Hydrofining with Minimal Octane Loss" and U.S. Pat. Nos. 5,985,136 and 6,013,598. Typical SCANfining conditions include one and two-stage processes for hydrodesulfurizing a naphtha feedstock. The feedstock is contacted with a hydrodesulfurization catalyst comprised of about 1 wt. % to about 10 wt. % $MoO_3$; and about 0.1 wt. % to about 5 wt. % CoO; and a Co/Mo atomic ratio of about 0.1 to about 1.0; and a median pore diameter of about 60 Å to about 200 Å.

Even though SCANfining controls the degree of olefin saturation while achieving a high degree of HDS, there is still a need to improve the selectivity of the catalyst system to further reduce the degree of olefin saturation thereby further minimizing octane number loss.

SUMMARY OF THE INVENTION

This invention relates to a method for making a catalyst and a method for the hydrodesulfurization (HDS) of naphtha. One embodiment relates to a method for making a catalyst suitable for the HDS of naphtha comprising: (i) impregnating a silica support that has a silica content of at least about 85 wt. %, based on silica and has a pore volume between about 0.6 cc/g and about 2.0 cc/g and median pore sizes in the range of about 150 Å to about 2000 Å with an aqueous solution of (a) a cobalt salt, (b) a molybdenum salt, and (c) at least one organic additive to form a catalyst precursor; (ii) drying the catalyst precursor at temperatures less than about 200° C. to form a dried catalyst precursor; and (iii) sulfiding the dried catalyst precursor to form the catalyst, provided that the dried catalyst precursor or catalyst is not calcined prior to sulfiding or use for HDS.

Another embodiment relates to a method for the HDS of naphtha having an olefin content of at least about 5 wt. %, based on the weight of the naphtha comprising: (i) contacting the naphtha with a selective HDS catalyst under hydrodesulfurization conditions, wherein the selective HDS catalyst is prepared by impregnating a silica support that has a silica content of at least about 85 wt. %, based on the weight of the silica, and has a pore volume between about 0.6 cc/g and about 2.0 cc/g, and median pore sizes in the range of about 150 Å to about 2000 Å with an aqueous solution of (a) a cobalt salt, (b) a molybdenum salt, and (c) at least one organic additive to form a catalyst precursor; (ii) drying the catalyst precursor at temperatures less than about 200° C. to form a dried catalyst precursor; and (iii) sulfiding the dried catalyst precursor to form the catalyst, provided that the dried catalyst precursor or catalyst is not calcined prior to sulfiding or use for HDS.

The silica supported catalyst, when used for the HDS of a naphtha, shows improved selectivity towards olefin saturation while maintaining a high level of HDS of the naphtha feed.

DETAILED DESCRIPTION OF THE INVENTION

Figure 1:
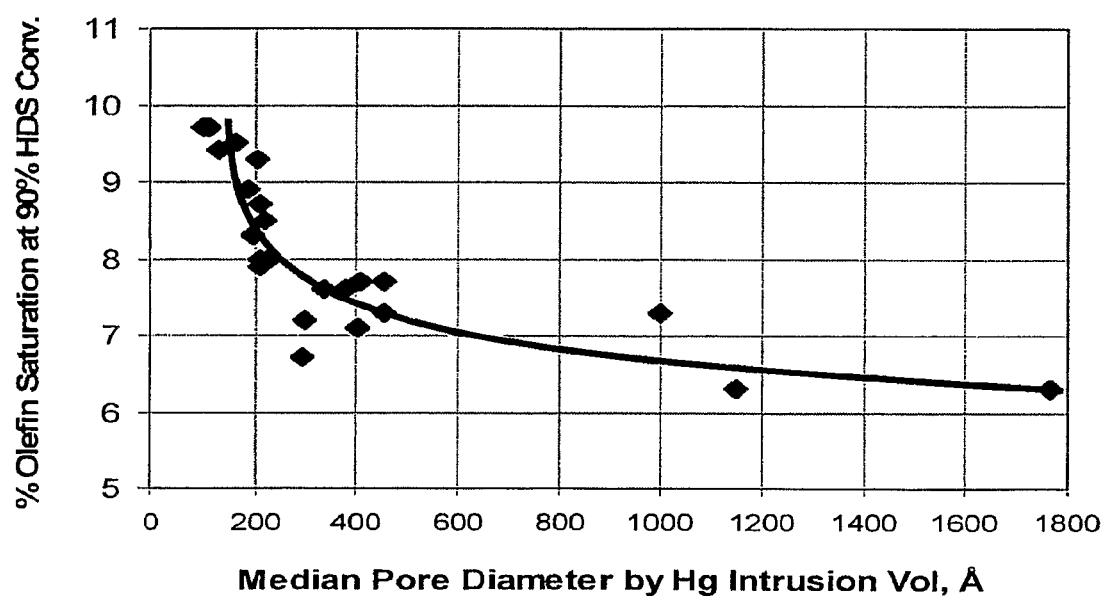
FIG. 1a is a plot of olefin saturation at 90% HDS vs. median pore diameter (MPD) measured by mercury intrusion.
FIG. 1b is a plot of olefin saturation at 90% HDS vs. the reciprocal of median pore diameter.
FIG. 1c is a plot of olefin saturation at 90% HDS vs. the percentage of surface area in pores with pore diameter >150 Å.
Figure 1:
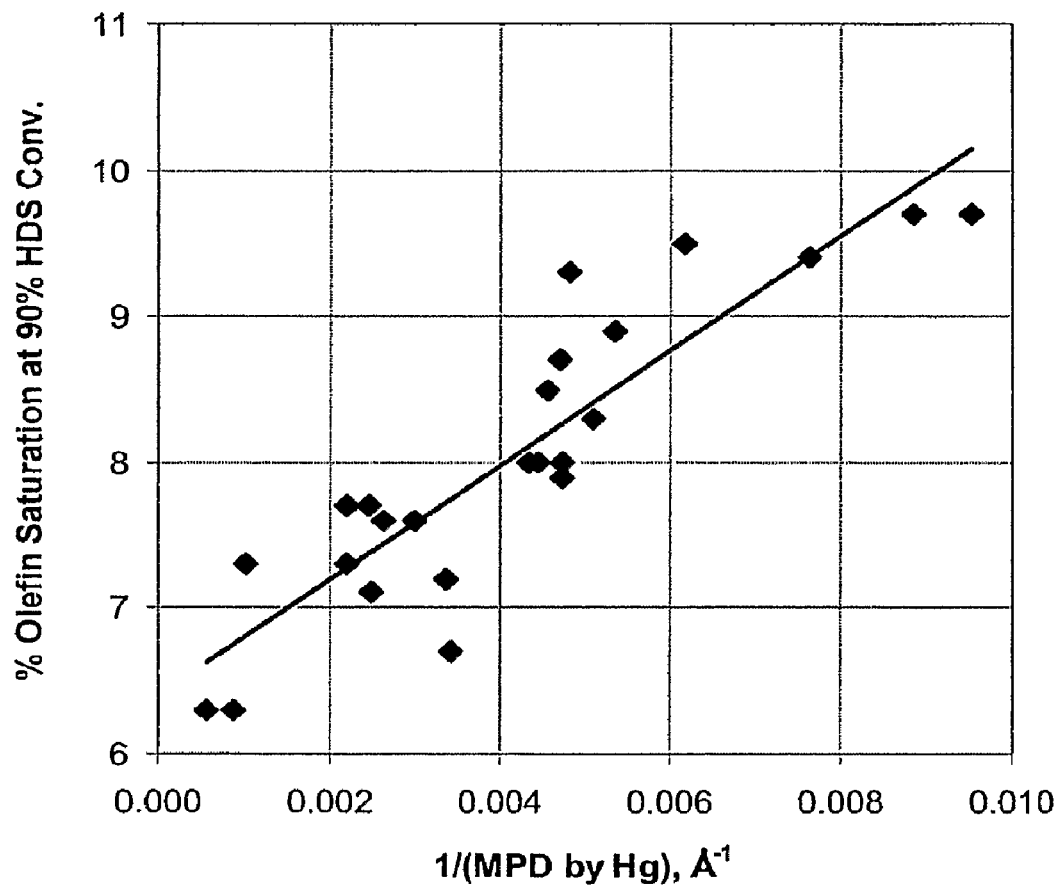
Figure 1:
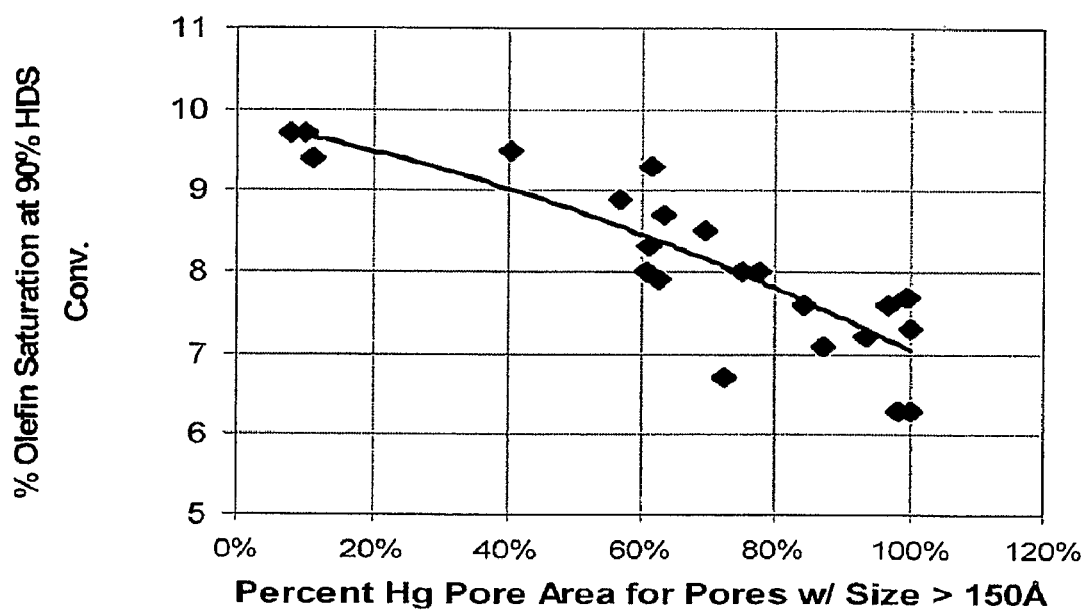

The term "naphtha" refers to the middle boiling range hydrocarbon fraction or fractions that are major components of gasoline, while the term "FCC naphtha" refers to a preferred naphtha that has been produced by the well known process of fluid catalytic cracking. Naphthas having a middle boiling range are those have boiling points from about 10° C. (i.e., from about $C_5$) to about 232° C. (50 to 450° F.) at atmospheric pressure, preferably from about 21° C. to about 221° C. (70 to 430° F.). Producing naphtha in an FCC process without added hydrogen results in a naphtha that is relatively high in olefins and aromatics. Other naphthas such as steam cracked naphthas and coker naphthas may also contain relatively high concentrations of olefins. Typical olefinic naphthas have olefin contents of at least about 5 wt. % up to about 60 wt. %, based on the weight of the naphtha, preferably about 5 wt. % to about 40 wt. %; sulfur contents from about 300 ppmw to about 7000 ppmw, based on the weight of the naphtha; and nitrogen contents from about 5 ppmw to about 500 ppmw, based on the weight of the naphtha. Olefins include open chain olefins, cyclic olefins, dienes and cyclic hydrocarbons with olefinic side chains. Because olefins and aromatics are high octane number components, olefinic naphtha generally exhibits higher research and motor octane values than does hydrocracked naphtha. While olefinic naphthas are typically high in olefin content, they may also contain other compounds, especially sulfur-containing and nitrogen-containing compounds.

Selective Catalyst

In one embodiment, the catalyst for the selective removal of sulfur with minimal olefin saturation from an olefinic naphtha is a silica supported catalyst that has been impregnated with (a) a cobalt salt, (b) a molybdenum salt, and (c) at least one organic additive. Organic additives are organic ligands. The silica support contains at least about 85 wt. % silica, based on silica support, preferably at least about 90 wt. % silica, especially at least about 95 wt. % silica. Examples of silica supports include silica, MCM-41, silica-bonded MCM-41, fumed silica, metal oxide modified siliceous supports and diatomaceous earth.

The cobalt and molybdenum salts used to impregnate the silica support may be any water-soluble salts. Preferred salts include carbonates, nitrates, heptamolybdate and the like. The amount of salt is such that the silica support will contain from about 2 wt. % to about 8 wt. % cobalt oxide, based on catalyst, preferably from about 3 wt. % to about 6 wt. %, and from about 8 wt. % to about 30 wt. % molybdenum oxide, preferably about 10 wt. % to about 25 wt. %, based on support.

The silica supports have large pore volumes as measured by mercury porosimetry using ASTM method no. D4284 and large pore sizes. The pore volumes are in the range from about 0.6 cc/g to about 2.0 cc/g, preferably about 1.0 to about 1.5. The median pore sizes as measured by mercury are in the range from about 150 Å to about 2000 Å, preferably about 150 Å to about 1000 Å, more preferably 200 Å to about 500 Å. Silica supports having the desired median pore sizes are commercially available.

While not wishing to be bound to any particular theory, it is postulated that the present silica supports with large pore sizes and large pore diameters when combined with organic additives, i.e., organic ligands such as arginine, citric acid and urea, lead to an HDS catalyst having the desired selectivity towards olefin saturation while maintaining the activity of the HDS catalyst for desulfurizing the naphtha feed. The organic ligands may cause metals to be distributed throughout the silica support which in turn is a factor in the increased selectivity exhibited by the present catalysts. During the HDS reaction, the catalysts have minimum diffusion constraints. The large pores of these silica supports allow free, transport of gas phase naphtha range hydrocarbons to and away from the HDS catalysts active sites. This helps to fully utilize the intrinsic characteristics of low olefin saturation of the present catalysts.

The silica support may also be doped with metals from Groups 2-4 of the Periodic Table based on the IUPAC format having Groups 1-18, preferably from Groups 2 and 4. Examples of such metals include Zr, Mg, Ti. See, e.g., The Merck Index, Twelfth Edition, Merck & Co., Inc., 1996.

As noted above, organic ligands are organic additives that are hypothesized to aid in distributing the Co and Mo components on the silica support. The organic ligands contain oxygen and/or nitrogen atoms and include mono-dentate, bi-dentate and poly-dentate ligands. The organic ligands may also be chelating agents. Organic ligands include at least one of carboxylic acids, polyols, amino acids, amines, amino alcohols, ketones, esters and the like. Examples of organic ligands include phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, and nitrilotriacetic acid (NTA), citric acid and urea.

While not wishing to be bound to any particular theory, it is postulated that the organic ligands form complexes with at least one of Co and Mo. These Co- and/or Mo-organic ligand complexes interact with the silica surface to disperse the metals more evenly across the silica surface.

Catalyst Preparation and Use

Silica supports were impregnated with aqueous solutions of Co and Mo salts using conventional techniques. The organic ligand may be added to the aqueous solution of salts prior to contact with the silica support. One embodiment for impregnating the silica support with metal salt is by the incipient wetness method. In this method, an aqueous solution containing metal salts and organic additive is mixed with the support up to the point of incipient wetness using conventional techniques, i.e., techniques that are well known in the art of hydroprocessing catalyst preparation, manufacture, and use.

The manner of impregnation of the silica support by metal salt may be by impregnating the silica support with a mixture of a cobalt salt and organic ligand using incipient wetness, drying the impregnated support and then impregnating the dried support with a molybdenum salt solution or molybdenum salt solution containing organic ligand up to the point of incipient wetness. In another embodiment, the order of impregnation by cobalt salt followed by molybdenum salt may be reversed. In yet another embodiment, the support may be co-impregnated with a mixture of cobalt salt and molybdenum salt plus organic ligand to incipient wetness. The co-impregnated support may be dried and the co-impregnation process repeated. In yet another embodiment, an extruded silica support may be impregnated with a mixture of cobalt salt, molybdenum salt and organic ligand and the impregnated support dried. This treatment may be repeated if desired. In all the above embodiments, the organic ligand may be a single ligand or may be a mixture of ligands. The impregnated silica support isolated from the reaction mixture is heated and dried at temperatures in the range from about 50° C. to about 200° C. to form a catalyst precursor. The drying may be under vacuum, or in air, or inert gas such as nitrogen.

The dried catalyst precursor is treated with hydrogen sulfide at concentrations of from about 0.1 vol. % to about 10 vol. % based on total volume of gases present, for a period of time and at a temperature sufficient to convert metal oxide, metal salt or metal complex to the corresponding sulfide in order to form the HDS catalyst. The hydrogen sulfide may be generated by a sulfiding agent incorporated in or on the catalyst precursor. In an embodiment, the sulfiding agent is combined with a diluent. For example, dimethyl disulfide can be combined with a naphtha diluent. Lesser amounts of hydrogen sulfide may be used, but this may extend the time required for activation. An inert carrier may be present and activation may take place in either the liquid or gas phase. Examples of inert carriers include nitrogen and light hydrocarbons such as methane. When present, the inert gases are included as part of the total gas volume. Temperatures are in the range from about 150° C. to about 700° C., preferably about 160° C. to about 343° C. The temperature may be held constant or may be ramped up by starting at a lower temperature and increasing the temperature during activation. Total pressure is in the range up to about 5000 psig (34576 kPa), preferably about 0 psig to about 5000 psig (101 to 34576 kPa), more preferably about 50 psig to about 2500 psig (446 to 17338 kPa). If a liquid carrier is present, the liquid hourly space velocity (LHSV) is from about 0.1 hr$^{-1}$ to about 12 hr$^{-1}$, preferably about 0.1 hr$^{-1}$ to about 5 hr$^{-1}$. The LHSV pertains to continuous mode. However, activation may also be done in batch mode. Total gas rates may be from about 89 m$^3$/m$^3$ to about 890 m$^3$/m$^3$ (500 to 5000 scf/B).

Catalyst sulfiding may occur either in situ or ex situ. Sulfiding may occur by contacting the catalyst with a sulfiding agent, and can take place with either a liquid or gas phase sulfiding agent. Alternatively, the catalyst may be presulfurized such that H$_2$S may be generated during sulfiding. In a liquid phase sulfiding agent, the catalyst to be sulfided is contacted with a carrier liquid containing sulfiding agent. The sulfiding agent may be added to the carrier liquid or the carrier liquid itself may be sulfiding agent. The carrier liquid is preferably a virgin hydrocarbon stream and may be the feedstock to be contacted with the hydroprocessing catalyst but may be any hydrocarbon stream such as a distillate derived from mineral (petroleum) or synthetic sources. If a sulfiding agent is added to the carrier liquid, the sulfiding agent itself may be a gas or liquid capable of generating hydrogen sulfide under activation conditions. Examples include hydrogen sulfide, carbonyl sulfide, carbon disulfide, sulfides such as dimethyl sulfide, disulfides such as dimethyl disulfide, and polysulfides such as di-t-nonylpolysulfide. The sulfides present in certain feeds, e.g., petroleum feeds, may act as sulfiding agent and include a wide variety of sulfur-containing species capable of generating hydrogen sulfide, including aliphatic, aromatic and heterocyclic compounds.

The dried catalyst is not calcined prior to either sulfiding or use for HDS. Not calcining means that the dried catalyst is not heated to temperatures above about 300° C., preferably about 200° C. By not calcining the catalyst, from about 60% to about 100% of the dispersing aid remains on the catalyst prior to sulfiding or use for HDS.

Following sulfiding, the catalyst may be contacted with naphtha under hydrodesulfurizing conditions. Hydrodesulfurizing conditions include temperatures of from about 150° C. to about 400° C., pressures of from about 445 kPa to about 13890 kPa (50 to 2000 psig), liquid hourly space velocities of from about 0.1 to about 12 and treat gas rates of from about 89 m$^3$/m$^3$ to about 890 m$^3$/m$^3$ (500 to 5000 scf/B). After hydrodesulfurization, the desulfurized naphtha can be conducted away for storage or further processing, such as stripping to remove hydrogen sulfide. The desulfurized naphtha is useful for blending with other naphtha boiling-range hydrocarbons to make mogas.

Selected embodiments, including preferred embodiments, are illustrated in the following examples.

Example 1

This example demonstrates an important feature of the subject CoMo supported on SiO$_2$ catalysts which is to maximize the mass transport rate for the HDS reaction; that is, to minimize diffusion limitations for this reaction. For catalyst spheres and extrudates with cross-section diameters of about 1.3 to about 2.4 mm, median pore sizes of about 200 Å to about 2000 Å allows for effective access of naphtha range sulfur containing molecules in and out of the catalyst particles. Reducing the pore sizes of the silica supports leads to diffusion limitations on the HDS reaction, and to more olefin saturation at a given HDS level, as shown in FIG. 1. In FIG. 1a, the Y-axis is the olefin saturation tendency expressed as a percentage of C$_5$ olefin saturation at 90% HDS conversion (both measured on a weight basis), and the X-axis is the median pore diameter in Angstroms, measured by mercury porosimetry, of silica supports of extrudates or spheres with nominal cross-section diameter in the range of about 1.3 mm to about 2.4 mm. As a reference, a commercial catalyst (RT-225) manufactured by Albemarle (CoMo/Al$_2$O$_3$, ¹⁄₁₆" cylinder extrudate) tested under the identical conditions shows 14 wt. % C$_5$ olefin saturation at 90% HDS conversion, based on the weight of the sulfur and olefin in the naphtha. Compared to the reference catalyst, all catalysts on silica supports shown in FIG. 1a have lower olefin saturation. In particular, when the pore sizes of the silica supports are larger than 200 Å, the olefin saturation is reduced to 8% or below, much lower than the reference catalyst. As the median pore diameter increases above 200 Å, selectivity continues to improve. When the median pore diameter is between about 500 Å to 2000 Å, olefin saturation is nearly flat/constant, indicating that diffusion is no longer affecting HDS reactions under the testing conditions employed, and pore size is no longer limiting selectivity. As shown in FIG. 1b, which is a plot of olefin saturation vs. the reciprocal of median pore diameter, olefin saturation shows a linear relationship to the reciprocal of median pore diameters of the silica supports. As shown in FIG. 1c, there is also correlation of olefin saturation with the percentage of surface area in pores with pore diameter over about 150 Å.

Table 1 lists various silica supports together with their median pore diameters (by Hg porosimetry) and surface areas (by nitrogen BET measurement) as well as percentages of olefin saturation at 90% HDS conversion, based on the weight of the sulfur in the naphtha. This table shows examples of silica supports and their porosities and olefin selectivity when used as HDS catalyst carriers.

TABLE 1

Silica Supports Used as HDS Catalyst Carriers

| Support ID | Silica Support Description | Median Pore Size by Hg Volume, Å | PV by Hg, cc/g | Total Hg Pore Area | Hg Area for MPD >150 Å | Hg Area for MPD <150 Å | % SA for MPD >150 A | % SA for MPD <150 A | Hg SA for MPD >100 Å | Hg SA for MPD <100 Å | N2 BET SA, m²/g | % $C_5^-$ Saturation at 90% HDS | 1/(Pore Diamter), Å$^{-1}$ |
|---|---|---|---|---|---|---|---|---|---|---|---|---|---|
| SC-509 | 1.4-2.4 mm spheres (PQ) | 131 | 1.10 | 316.7 | 36.2 | 280.6 | 11% | 89% | 287.2 | 29.6 | 218 | 9.4 | 0.0076 |
| SC-509-5S | 1.4-2.4 mm spheres | 455 | 1.12 | 97.0 | 97.0 | 0.0 | 100% | 0% | 97.0 | 0.0 | 55 | 7.3 | 0.0022 |
| SC-592 | 1/16" cylinder (Criterion) | 162 | 1.12 | 313.0 | 126.3 | 186.8 | 40% | 60% | 220.4 | 92.6 | 234 | 9.5 | 0.0062 |
| SC-593 | 1/16" cylinder (Criterion) | 454 | 1.04 | 89.9 | 89.7 | 0.2 | 100% | 0% | 89.7 | 0.2 | 56 | 7.7 | 0.0022 |
| SC-741 | 1/20" quadrilobe | 336 | 1.19 | 156.9 | 132.5 | 24.4 | 84% | 16% | 146.6 | 10.3 | 194 | 7.6 | 0.0030 |
| SC-742 | 1/16" cylinder | 208 | 0.98 | 199.8 | 123.5 | 76.3 | 62% | 38% | 157.3 | 42.5 | 184 | 9.3 | 0.0048 |
| SC-743 | 1/20" quadrilobe | 212 | 0.99 | 196.4 | 124.8 | 71.6 | 64% | 36% | 157.3 | 39.0 | 176 | 8.7 | 0.0047 |
| SC-745 | 1/20" quadrilobe | 187 | 0.89 | 198.2 | 112.4 | 85.7 | 57% | 43% | 152.3 | 45.9 | 186 | 8.9 | 0.0053 |
| SC-747 | 1/16" cylinder | 211 | 0.93 | 203.0 | 123.8 | 79.1 | 61% | 39% | 158.0 | 45.0 | 203 | 8 | 0.0047 |
| SC-748 | 1/20" quadrilobe | 211 | 0.94 | 205.1 | 128.8 | 76.3 | 63% | 37% | 163.1 | 41.9 | 205 | 7.9 | 0.0047 |
| SC-795 | 1/16" cylinder (Criterion) | 410 | 1.07 | 107.8 | 107.0 | 0.8 | 99% | 1% | 107.8 | 0.0 | 72 | 7.7 | 0.0024 |
| SC-826 | 1.7-2.0 mm spheres (PQ) | 113 | 1.06 | 345.5 | 35.3 | 310.2 | 10% | 90% | 276.0 | 69.5 | 283 | 9.7 | 0.0088 |
| SC-924 | 1.7-2.0 mm spheres (PQ) | 105 | 1.21 | 414.5 | 32.8 | 381.8 | 8% | 92% | 295.4 | 119.2 | 274 | 9.7 | 0.0095 |
| SC-926 | 1/20" quadrilobe | 219 | 0.71 | 149.9 | 104.7 | 45.3 | 70% | 30% | 132.3 | 17.7 | 190 | 8.5 | 0.0046 |
| SC-927 | 1/20" quadrilobe | 230 | 0.70 | 138.4 | 104.0 | 34.4 | 75% | 25% | 124.3 | 14.1 | 112 | 8 | 0.0043 |
| SC-928 | 1/20" quadrilobe | 381 | 0.67 | 73.2 | 70.8 | 2.4 | 97% | 3% | 72.8 | 0.3 | 51 | 7.6 | 0.0026 |
| SC-1063 | 1/16" cylinder | 999 | 0.66 | 26.7 | 26.7 | 0.0 | 100% | 0% | 26.7 | 0.0 | 14 | 7.3 | 0.0010 |
| SC-1236 | Ultrasil (80:20 w/ Nyacol) steam 1200 F./1 h | 196 | 0.777 | 184.3 | 113.0 | 71.3 | 61% | 39% | 146.7 | 37.6 | 151 | 8.3 | 0.0051 |
| SC-1237 | Ultrasil (80:20 w/ Nyacol) steam 1400 F./1 h | 224 | 0.73 | 146.7 | 114.2 | 32.6 | 78% | 22% | 131.7 | 15.1 | 108 | 8 | 0.0045 |
| SC-1238 | Ultrasil (80:20 w/ Nyacol) steam 1500 F./1 h | 298 | 0.686 | 98.5 | 92.2 | 6.3 | 94% | 6% | 96.1 | 2.4 | 68 | 7.2 | 0.0034 |
| SC-1239 | Stm ultrasil/Nyacol/ PVA 1/20" Q 1500 F./45 m | 1769 | 0.762 | 20.1 | 20.1 | 0.0 | 100% | 0% | 20.1 | 0.0 | 13 | 6.3 | 0.0006 |
| SC-1240 | Steamed Ultrasil/ Nyacol/PVA 1/20" Q 1400 F./1 h | 1147 | 0.88 | 37.9 | 37.3 | 0.6 | 98% | 2% | 37.9 | 0.0 | 26 | 6.3 | 0.0009 |
| SC-1241 | Steam Ultrasil/ Nyacol/PVA 1/20" Q 1200 F./1 hr | 294 | 0.90 | 153.2 | 111.3 | 41.9 | 73% | 27% | 130.2 | 23.0 | 122 | 6.7 | 0.0034 |
| SC-1242 | Stm/air ultrasil/Nyacol/ PVA 1/20" Q 1300 F./45 m | 404 | 0.876 | 98.1 | 85.6 | 12.6 | 87% | 13% | 92.2 | 5.9 | 75 | 7.1 | 0.0025 |

As can be seen from the data in Table 1, silica catalysts having larger median pore diameters have lower olefin saturation (OSAT) at 90% HDS. In general, supports having similar surface areas but larger pore volumes will have larger pore sizes while carriers having similar pore volumes but larger surface areas will have smaller pore sizes.

Figure 2:
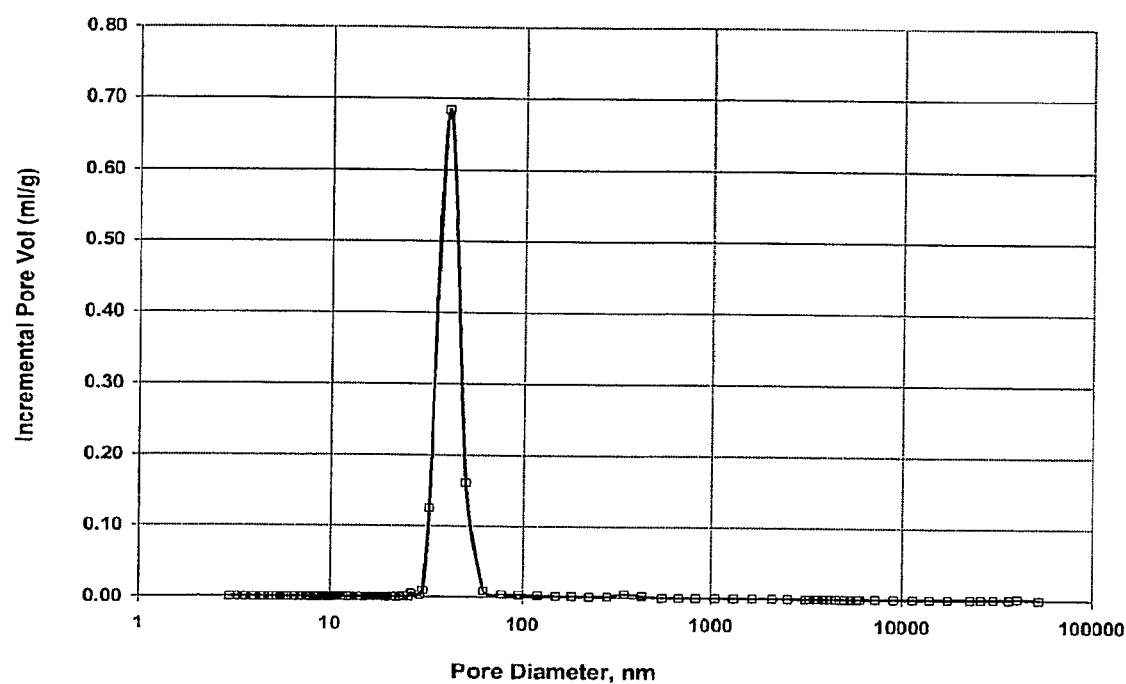
FIG. 2 is a graph showing pore size distribution (PSD) of a silica support as measured by mercury porosimetry.

FIG. 2 is a graph showing pore size distribution (PSD) of silica support SC-593 as measured by mercury porosimetry. As shown in FIG. 2, the silica support exhibits a uni-modal pore size distribution.

Example 2

The CoMo/silica catalysts were prepared by the incipient wetness technique. A molybdenum urea solution was prepared by dissolving ammonium heptamolybdate tetrahydrate and urea in distilled water and was impregnated on the silica support SC-593 so that the $MoO_3$ concentration on the final catalyst was 21.3 wt. %, based on the weight of the catalyst. The impregnated solid was dried under vacuum at 60° C. Four separate cobalt-organic ligand aqueous solutions were prepared by reacting cobalt carbonate hydrate with citric acid (CoCA), EDTA (CoEDTA), nitrilotriacetic acid (CoNTA), or ethylenediamine (CoEDA). Each cobalt-organic ligand solution was impregnated on the MoUrea/SC-593 so that the CoO concentration on the final catalyst was 5.3 wt. %, based on the weight of the catalyst. The catalysts were dried under vacuum at 60° C.

Figure 3:
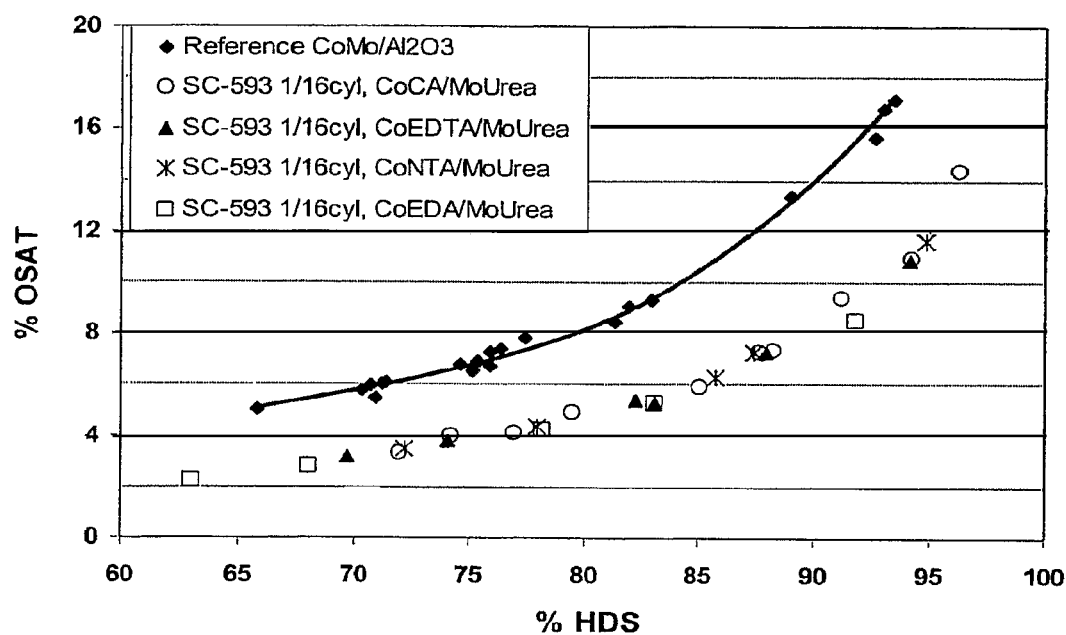
FIG. 3 is a plot of olefin selectivity vs. HDS activity for four different $CoMo/SiO_2$ catalysts.

The silica supported CoMo catalysts and a commercially available reference CoMo/$Al_2O_3$ (SC-154) catalyst were sulfided using 3% $H_2S$ in $H_2$ and virgin naphtha under sulfiding conditions. Feed for the catalyst evaluation was a $C_5$-177° C. (350° F.) FCC naphtha feed containing 1408 ppm S and 46.3 wt. % olefins, based on the weight of the feed. Catalysts were evaluated in an MCFB-48 unit (Multi Channel Fixed Bed-48 Reactor) at 274° C. (525° F.) at 220 psig using $H_2$. Feed flow rate was adjusted to obtain a range of 2-methylthiophene desulfurization from 65 wt. % to 95 wt. %, based on the weight of the feed. Product streams were analyzed using on-line GCs and SCDs. $C_5$ Olefin content in the product was compared with $C_5$ olefin content in the feed on a weight basis to calculate the percentage of olefin saturation (% OSAT). Results of % HDS and % OSAT were stable after about 30 hours of catalyst on stream, and were used to evaluate the olefin saturation (% OSAT) at various HDS conversions (% HDS). FIG. 3 plots the olefin selectivity vs. HDS activity for these four CoMo/$SiO_2$ (SC-593) catalysts and the industrial reference CoMo/$Al_2O_3$ catalyst. At 90% HDS conversion, there was about 7.7 wt. % olefin saturation for the CoMo/$SiO_2$ catalysts prepared using support SC-593, much less than the olefin saturation of 14 wt. % on the reference CoMo/$Al_2O_3$ catalyst.

Example 3

Three impregnation solutions were prepared by dissolving ammonium heptamolybdate tetrahydrate and cobalt carbonate hydrate with three organic ligands: citric acid (CA), nitrilotriacetic acid (NTA), and arginine (Arg). The cobalt-to-molybdenum atomic ratio was 0.48 in all three solutions. The CoMo-CA solution was impregnated on silica support SC-741 using the incipient wetness impregnation technique in a single step in an amount so that the dried solid would contain 5.85 wt, % CoO and 23.4 wt. % $MoO_3$, based on the weight of the catalyst. The impregnated solid was dried under vacuum at 60° C. The CoMo-NTA solution was also impregnated in a single step and dried under vacuum at 60° C. For the CoMo-Arg solution, the solubility was low and a double impregnation (with a vacuum drying at 60° C. after the first impregnation) was required in order to impregnate a similar amount of CoO (5.83 wt. %) and $MoO_3$ (23.4 wt. %) on the catalyst.

Figure 4:
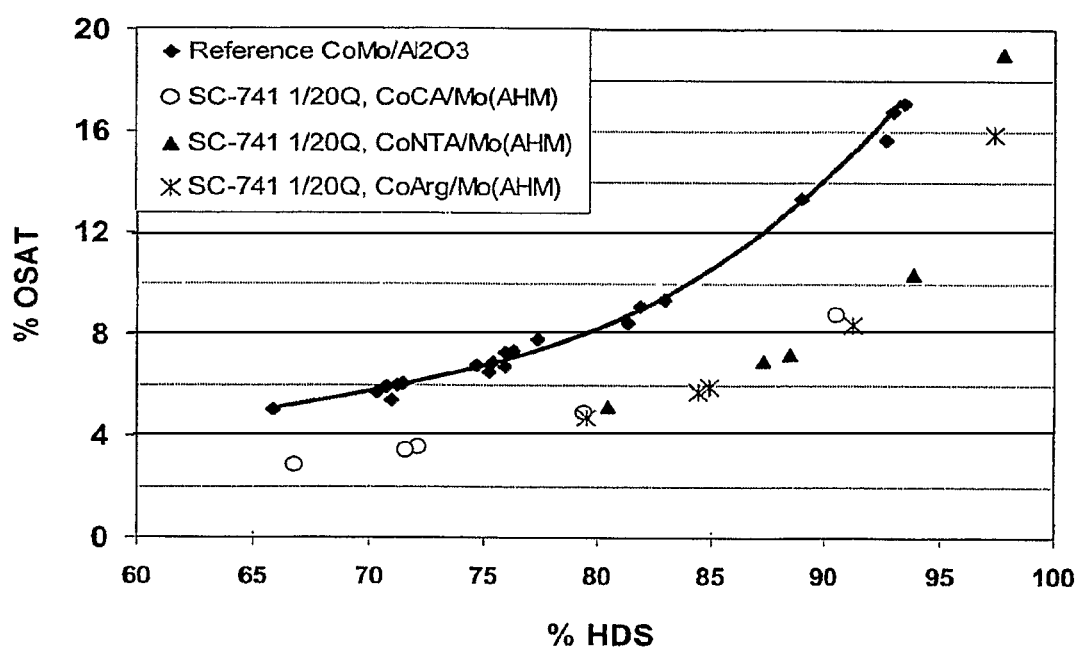
FIG. 4 is a plot of olefin selectivity vs. HDS activity for $CoMo/SiO_2$ catalysts having different organic ligands on a selected silica support and the reference $CoMo/Al_2O_3$ catalyst.

The catalyst evaluations of the CoMo/$SiO_2$ catalysts on SC-741 were done similar to the evaluation of CoMo/$SiO_2$ catalysts on support SC-593, as described above. FIG. 4 plots the olefin selectivity vs. HDS activity for these three CoMo/$SiO_2$(SC-741) catalysts and the industrial reference CoMo/$Al_2O_3$ catalyst. At 90 wt. % HDS conversion, there was about 7.6 wt. % olefin saturation for the CoMo/$SiO_2$ catalysts prepared using support SC-741, much less than the olefin saturation of 14 wt. % on the reference CoMo/$Al_2O_3$ catalyst.

Example 4

Two impregnation solutions were prepared by dissolving ammonium heptamolybdate tetrahydrate and cobalt carbonate hydrate with two organic chelating agents as ligands: citric acid (CA) and arginine (Arg). The cobalt to molybdenum atomic ratio was 0.48 in both solutions. The CoMo-CA solution was impregnated to silica support SC-743 using the incipient wetness impregnation technique in a single step in an amount so that the dried solid would contain 5.2 wt. % CoO and 20.9 wt. % $MoO_3$, based on the weight of the catalyst. The impregnated solid was dried under vacuum at 60° C. For the CoMo-Arg solution, the solubility was low and a double impregnation (with a vacuum drying at 60° C. after the first impregnation) was required in order to impregnate the same amount of CoO and $MoO_3$ on the SC-743 support.

Figure 5:
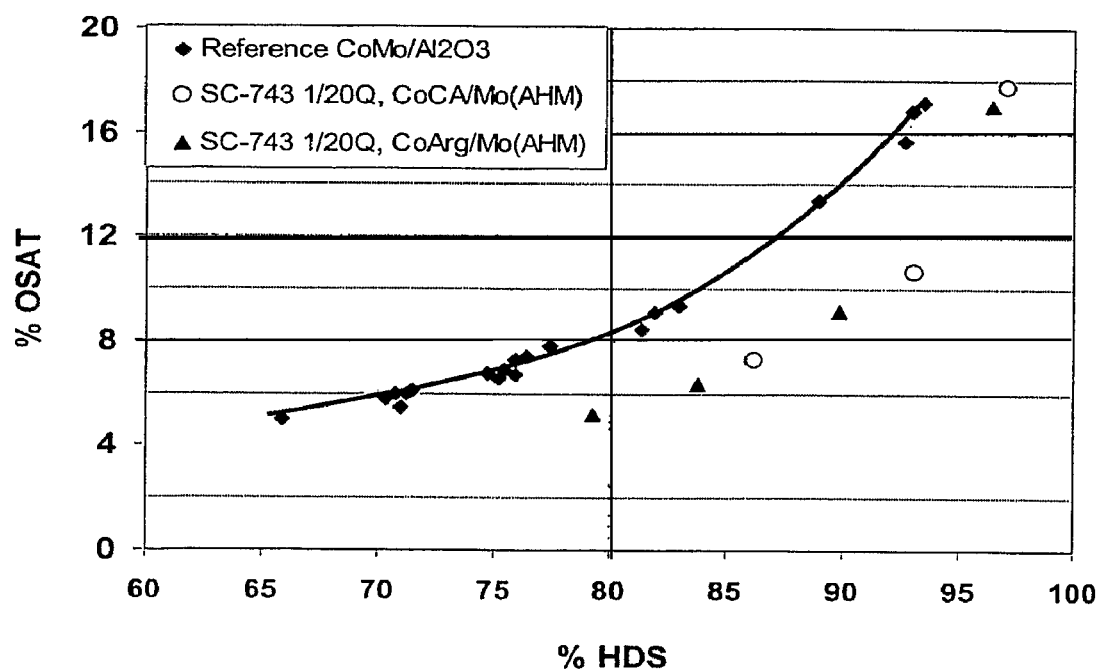
FIG. 5 is a plot of olefin selectivity vs. HDS activity for $CoMo/SiO_2$ catalysts prepared with different organic ligands and the reference $CoMo/Al_2O_3$ catalyst.

The evaluation was done similar to the evaluation of CoMo/$SiO_2$ catalysts on support SC-593, as described above in Example 2. FIG. 5 plots the olefin selectivity vs. HDS activity for these two CoMo/$SiO_2$(SC-743) catalysts and the industrial reference CoMo/$Al_2O_3$ catalyst. At 90% HDS conversion, there was about 8.7 wt. % olefin saturation for the CoMo/$SiO_2$ catalysts prepared using support SC-743, much less than the olefin saturation of 14 wt. % on the reference CoMo/$Al_2O_3$ catalyst.

Example 5

This example is directed to high temperature aging and stability of CoMo/$SiO_2$ catalysts. CoMo/$SiO_2$ catalysts prepared above were subject to a stability evaluation against the industrial reference CoMo/$Al_2O_3$ catalyst as follows. After about one week of MCFB-48 unit testing with FCC naphtha feed at 274° C. (525° F.), the reactor bed temperature was raised to 299° C. (570° F.) and aged at 570° F. for about 3 days. The temperature was then lowered to 274° C. (525° F.) and catalyst performance (olefin saturation and HDS activity) was evaluated. The reactor bed temperature was then raised again to 316° C. (600° F.) and aged at 316° C. for another 2 days. The temperature was then lowered to 274° C. (525° F.) again and catalyst performance (olefin saturation and HDS activity) was evaluated.

Figure 6:
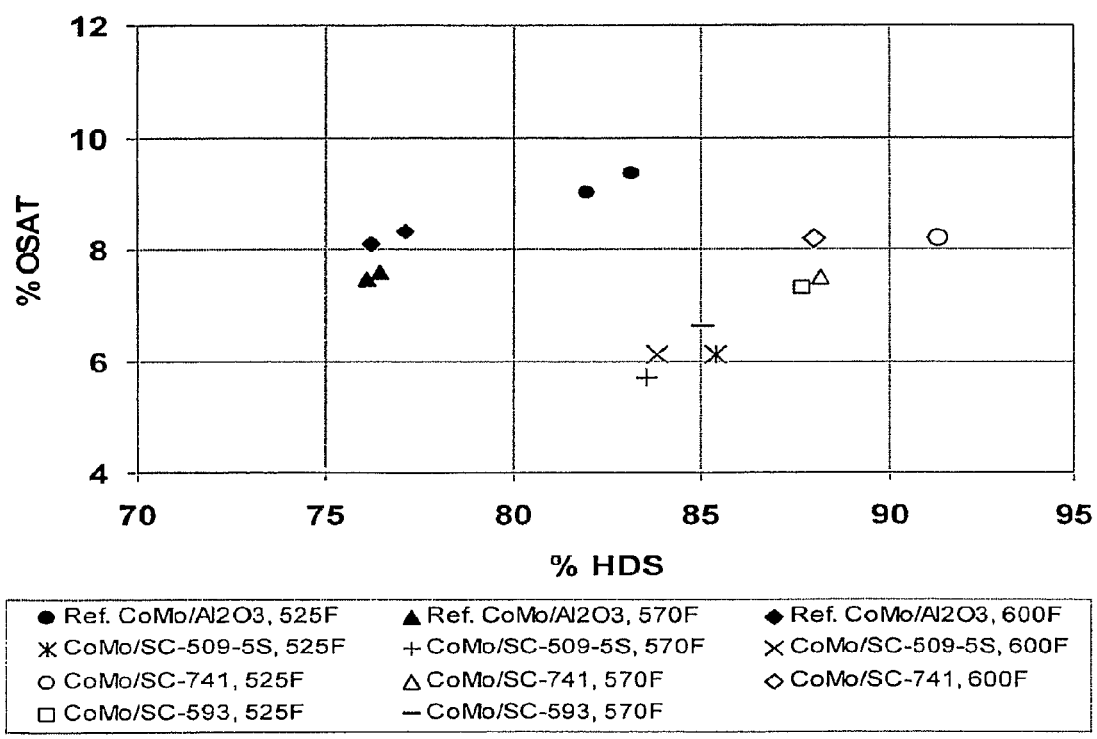
FIG. 6 is a plot of olefin selectivity vs. HDS activity of high temperature aged $CoMo/SiO_2$ and $CoMo/Al_2O_3$ catalysts.

Evaluation results are plotted for CoMo/$SiO_2$ Catalysts on silica supports SC-593, SC-741, and SC-509-5S, and are compared to the reference CoMo/$Al_2O_3$ catalyst in FIG. 6. It is apparent from FIG. 6 that the CoMo catalysts on silica supports were at least as stable as the reference CoMo/$Al_2O_3$ catalyst.

Example 6

An impregnation solution was prepared by dissolving ammonium heptamolybdate tetrahydrate and cobalt carbonate hydrate in aqueous citric acid. The cobalt to molybdenum atomic ratio was 0.48. The CoMo-CA solution was impregnated on the silica supports SC-745, 746, 747 and 748 using the incipient wetness impregnation technique in a single step in an amount so that the dried solid would contain 5.2 wt. % CoO and 20.9 wt. % $MoO_3$, based on the weight of the catalyst. The impregnated solid was dried under vacuum at 60° C.

Figure 7:
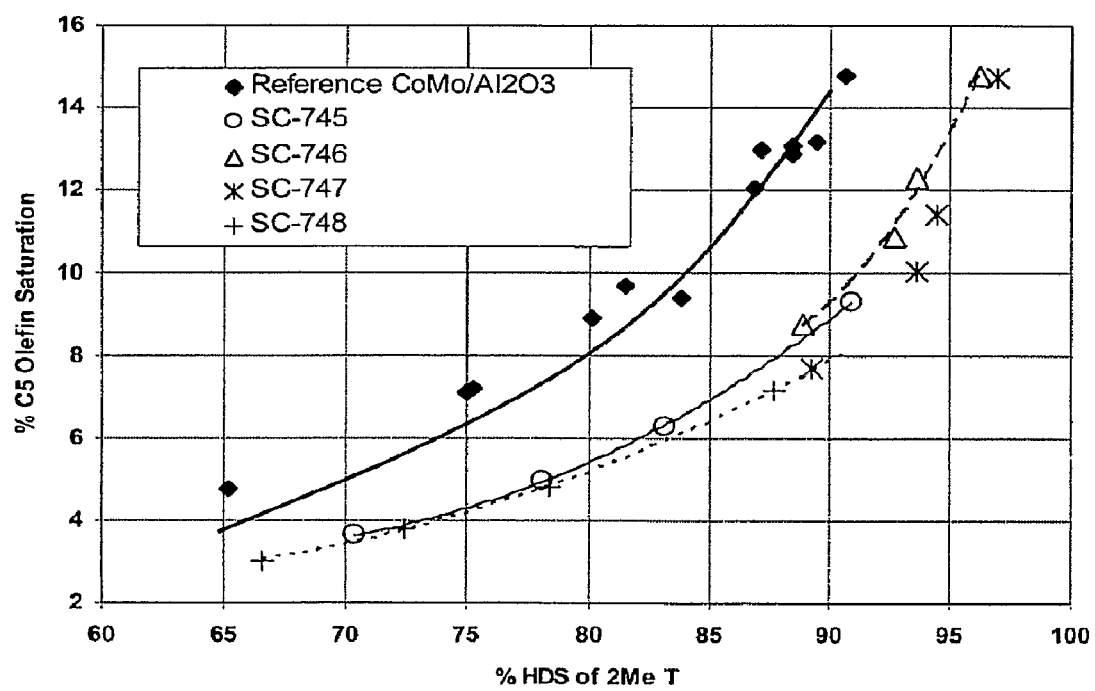
FIG. 7 is a plot of olefin selectivity vs. HDS activity for $CoMo/SiO_2$ catalysts vs. the reference $CoMo/Al_2O_3$ catalyst.

The evaluation was done similar to the evaluation of CoMo/$SiO_2$ catalysts on support SC-593, as described above. FIG. 7 plots the olefin selectivity vs. HDS activity for these four CoMo/$SiO_2$ catalysts (SC-745, 746, 747, 748) catalysts and the industrial reference CoMo/$Al_2O_3$ catalyst. At 90% HDS conversion (on a weight basis), CoMo/$SiO_2$ on SC-747 and SC-748 showed about 8% olefin saturation while the other two catalysts showed from 9 wt. % to 9.3 wt. % olefin saturation, which were much less than the olefin saturation of 14 wt. % on the reference CoMo/$Al_2O_3$ catalyst.

Example 7

This example is directed to air drying vs. vacuum drying of the impregnated silica support. An impregnation solution was prepared by dissolving ammonium heptamolybdate tetrahydrate and cobalt carbonate hydrate in aqueous citric acid (CA). The cobalt to molybdenum atomic ratio was 0.48 in these solutions. The CoMo-CA solution was impregnated on silica support SC-593 using the incipient wetness impregnation technique in a single step in an amount so that the dried solid would contain 5.3 wt. % CoO and 21.4 wt. % $MoO_3$, on a weight basis. The impregnated solid was dried under vacuum at 60° C. In another preparation using the same CoMo-CA solution and silica support SC-593, the impregnated solid was dried in air at 110° C. In a third preparation, the impregnated solid was dried in air at 180° C.

Figure 8:
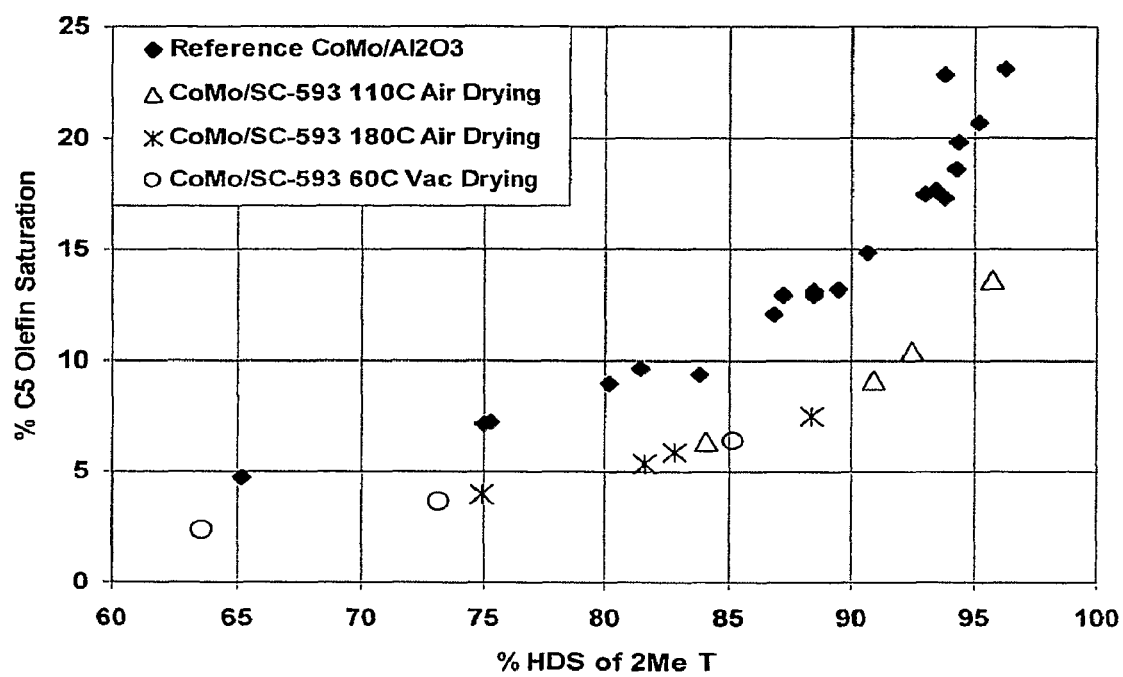
FIG. 8 is a plot of olefin selectivity vs. HDS activity for $CoMo-CA/SiO_2$ catalysts dried at three different conditions vs. the reference $CoMo/Al_2O_3$ catalyst.

The evaluations were done similar to the evaluation of CoMo/$SiO_2$ catalysts on support SC-593, as described above. FIG. 8 plots the olefin selectivity vs. HDS activity for the CoMo-CA/$SiO_2$ catalysts dried at three different conditions, and compared to the industrial reference CoMo/$Al_2O_3$ catalyst. At 90% HDS conversion (on a weight basis), these CoMo/$SiO_2$ catalysts showed similar selectivities (7.7 wt. % olefin saturation), which were much less than the olefin saturation of 14 wt. % on the reference CoMo/$Al_2O_3$ catalyst. These experiments demonstrate that CoMo/$SiO_2$ catalysts dried in air at 110° C. to 180° C. have similar selectivity in gasoline HDS as CoMo/$SiO_2$ catalysts dried under vacuum at 60° C.

Example 8

The effect of smaller pore sizes is demonstrated in this example. An impregnation solution was prepared by dissolving ammonium heptamolybdate tetrahydrate and cobalt carbonate hydrate in aqueous citric acid. The cobalt to molybdenum atomic ratio was 0.48. The CoMo-CA solution was impregnated on silica support SC-592 using the incipient wetness impregnation technique in a single step in an amount so that the dried solid would contain 5.6 wt. % CoO and 22.4 wt. % $MoO_3$, based on the weight of the catalyst. For silica support SC-595, less impregnation solution was used so that the final dried solid would contain 3.8 wt. % CoO and 15.3 wt. % $MoO_3$, based on the weight of the catalyst. Both impregnated solids were dried under vacuum at 60° C.

Figure 9:
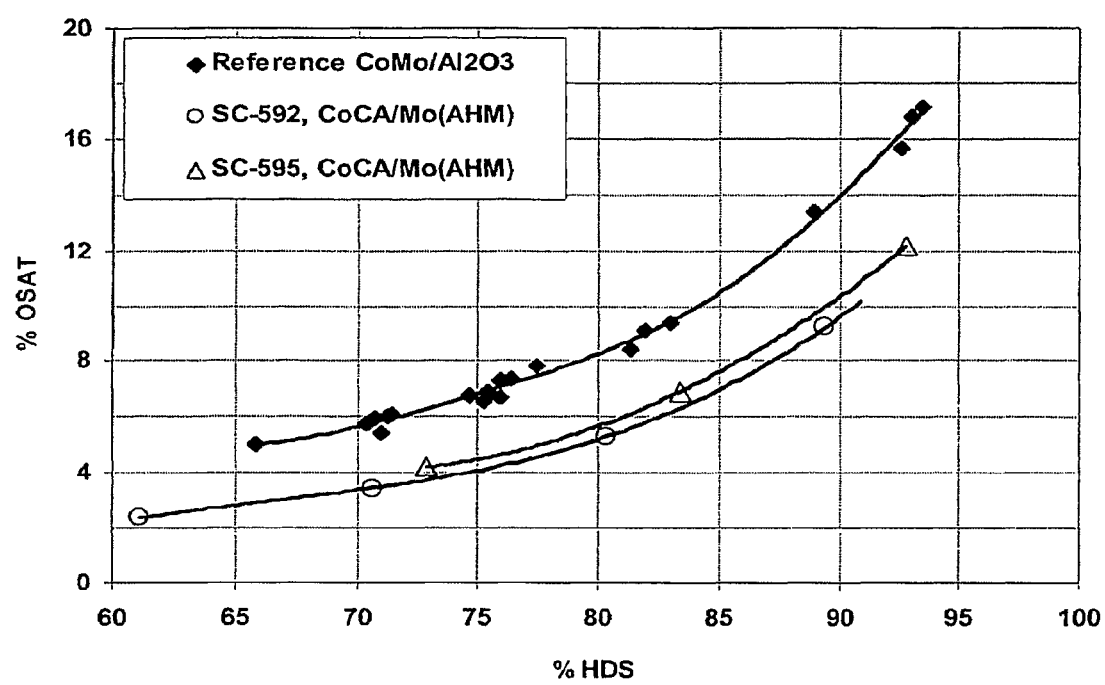
FIG. 9 is a plot of olefin selectivity vs. HDS activity for two small pore $CoMo/SiO_2$ catalysts vs. the reference $CoMo/Al_2O_3$ catalyst.
Figure 10:
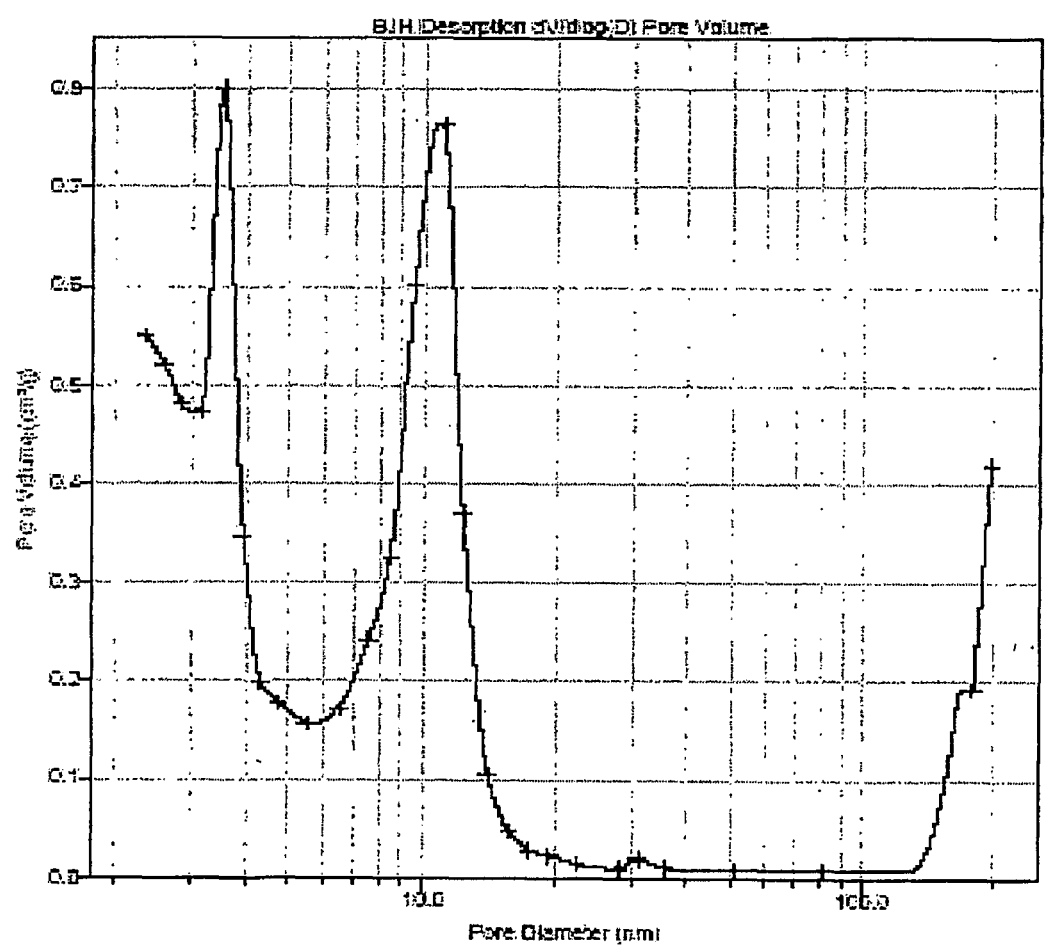
FIG. 10 is a graph showing pore size distribution (PSD) of a silica support (SC-595) as measured by $N_2$ adsorption.

The evaluation was done similar to the evaluation of CoMo/$SiO_2$ catalysts on support SC-593, as described above. FIG. 9 plots the olefin selectivity vs. HDS activity for these two CoMo/$SiO_2$ catalysts (SC-592, 595) catalysts and the industrial reference CoMo/$Al_2O_3$ catalyst. At 90% HDS conversion, CoMo/$SiO_2$ on SC-592 showed about 9.5% olefin saturation while CoMo/$SiO_2$ on SC-595 showed about 10.3% olefin saturation. SC-595 is a 1/16" cylinder and has a bi-modal pore size distribution with the pores centered around 35 Å and slightly over 100 Å. FIG. 10 is a pore size distribution plot of SC-595 obtained by $N_2$ adsorption analysis. The $N_2$ adsorption was used over Hg intrusion due to the small pores of SC-595. These results demonstrate that directionally, supports having smaller pores may result in greater olefin saturation than supports having larger pores. Thus the smaller pores of SC-592 and 595 resulted in poorer selectivity relative to the larger pore silica supported catalysts as shown in the previous example. However, the small pore silica of this example still exhibits better selectivity than the reference catalyst, RT-225.

The invention claimed is:

1. A method for making a catalyst suitable for the HDS of naphtha comprising:
    (i) impregnating a silica support that has a silica content of at least about 85 wt. %, based on silica, and has a pore volume between about 0.6 cc/g and about 2.0 cc/g, and median pore sizes in the range of about 200 Å to 2000 Å with an aqueous solution of (a) a cobalt salt, (b) a molybdenum salt, and (c) at least one organic additive to form a catalyst precursor;
    (ii) drying the catalyst precursor at temperatures less than about 200° C. to form a dried catalyst precursor; and
    (iii) sulfiding the dried catalyst precursor to form the catalyst provided that the dried catalyst precursor or catalyst is not calcined prior to sulfiding or use for HDS.

2. A method for the HDS of naphtha having an olefin content of at least about 5 wt. %, based on the weight of the naphtha comprising:
    (i) contacting the naphtha with a selective HDS catalyst under hydrodesulfurization conditions, wherein the selective HDS catalyst is prepared by impregnating a silica support that has a silica content of at least about 85 wt. %, based on the weight of the silica, and has a pore volume between about 0.6 cc/g and about 2.0 cc/g, and median pore sizes in the range of about 200 Å to about 2000 Å with an aqueous solution of (a) a cobalt salt, (b) a molybdenum salt, and (c) at least one organic additive to form a catalyst precursor;
    (ii) drying the catalyst precursor at temperatures less than about 200° C. to form a dried catalyst precursor; and
    (iii) sulfiding the dried catalyst precursor to form the catalyst, provided that the dried catalyst precursor or catalyst is not calcined prior to sulfiding or use for HDS.

3. The method of claims 1 or 2 wherein the silica support has a pore volume between about 1.0 cc/g and about 1.5 cc/g.

4. The method of claims 1 or 2 wherein the naphtha is at least one of FCC naphtha, steam cracked naphtha or coker naphtha.

5. The method of claim 1 or 2 wherein the naphtha has an olefin content from about 5 wt. % to about 60 wt. %, nitrogen content of from about 5 ppmw to about 500 ppmw and sulfur content from about 300 ppmw to about 7000 ppmw, based on naphtha.

6. The method of claim 1 or 2 wherein the silica support contains at least about 90 wt. % silica.

7. The method of claim 1 or 2 wherein the amounts of cobalt salt and molybdenum salts are sufficient to provide a catalyst support containing from about 2 wt. % to about 8 wt. % cobalt oxide and about 8 wt. % to about 30 wt. % molybdenum oxide, based on silica support.

8. The methods of claim 1 or 2 wherein the organic additive contains oxygen atoms, nitrogen atoms or both.

9. The methods of claim 1 or 2 wherein the organic additive is an organic ligand.

10. The method of claim 9 wherein the organic ligand is a mono-dentate, bi-dentate or poly-dentate ligand.

11. The method of claim 10 wherein the organic ligand is at least one carboxylic acid, polyol, amino acid, amine, amide, amino alcohol, ketone or ester.

12. The method of claim 11 wherein the organic ligand is at least one of phenanthroline, quinolinol, salicylic acid, acetic acid, ethylenediaminetetraacetic acid (EDTA), cyclohexanediaminetetraacetic acid (CYDTA), alanine, arginine, triethanolamine (TEA), glycerol, histidine, acetylacetonate, guanidine, nitrilotriacetic acid (NTA), citric acid or urea.

13. The method of claim 9 wherein the organic additive is a chelating agent.

14. The method of claim 1 or 2 wherein the organic additive is a metal dispersion aid.

15. The method of claim 1 or 2 wherein the catalyst precursor is dried at temperatures of from about 50° C. to 200° C.

16. The method of claim 1 or 2 wherein sulfiding of catalyst precursor may be in-situ or ex-situ in the presence of at least one sulfiding agent.

17. The method of claim 16 wherein the sulfiding agent is hydrogen sulfide at concentrations of from about 0.1 vol. % to about 10 vol. %, based on total volume of gases present.

18. The method of claim 2 wherein hydrodesulfurizing conditions include temperatures of from about 150° C. to about 400° C., pressures of from about 445 kPa to about 13890 kPa (50 to 2000 psig), liquid hourly space velocities of from about 0.1 to about 12 and hydrogen treat gas rates of from about 89 m$^3$/m$^3$ to about 890 m$^3$/m$^3$ (500 to 5000 scf/B).

19. The method of claims 1 or 2 wherein the dried catalyst precursor or sulfided catalyst is not heated to temperatures greater than about 300° C. prior to sulfiding or use for HDS.

* * * * *